United States Patent [19]
Busch

[11] Patent Number: 4,948,328
[45] Date of Patent: Aug. 14, 1990

[54] QUICK ATTACH BUCKET SYSTEM FOR BACKHOES AND THE LIKE

[76] Inventor: Ronald S. Busch, 2342 Buffalo Ave., Ventura, Calif. 93003

[21] Appl. No.: 421,664

[22] Filed: Oct. 16, 1989

[51] Int. Cl.⁵ .................................................. E02F 3/32
[52] U.S. Cl. .................................... 414/723; 172/273; 403/4; 403/262
[58] Field of Search ............. 414/723, 694, DIG. 912; 172/272-275; 37/DIG. 3, 12, 117.5; 403/4, 262, 381

[56] References Cited

U.S. PATENT DOCUMENTS

| | | | |
|---|---|---|---|
| 4,042,131 | 8/1977 | Buttke | 414/694 |
| 4,408,949 | 10/1983 | Witty | 414/694 |
| 4,639,183 | 1/1987 | Guthoff | 414/723 X |
| 4,833,799 | 5/1989 | Harte et al. | 172/274 X |

FOREIGN PATENT DOCUMENTS

| | | | |
|---|---|---|---|
| 1101961 | 4/1955 | France | 414/723 |
| 1021722 | 6/1983 | U.S.S.R. | 414/723 |

*Primary Examiner*—David A. Bucci
*Assistant Examiner*—Donald W. Underwood
*Attorney, Agent, or Firm*—Richard L. Miller

[57] ABSTRACT

A quick attachment mounting plate comprises a flat back plate adapted to be bolted to thrust plates on the back of a backhoe bucket, and a pair of mounting arms extending perpendicularly from the back plate adapted to be connected to a support arm and control linkage of a backhoe or the like. The mounting plate may be reversed so the bucket may be worked toward the backhoe or worked away from the backhoe. A bucket angling device attachable to the mounting plate permits horizontal rotation of the bucket.

5 Claims, 1 Drawing Sheet

U.S. Patent  Aug. 14, 1990  4,948,328
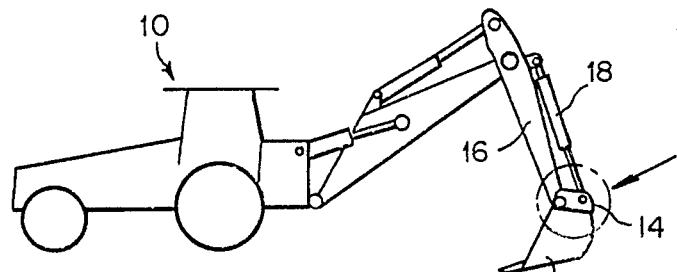
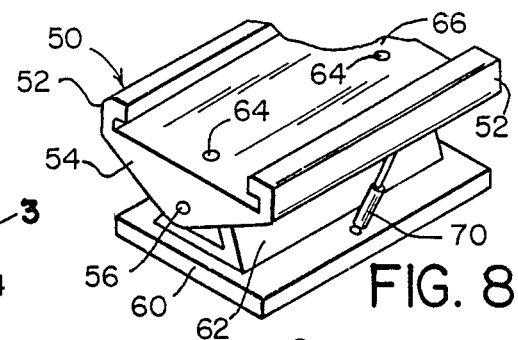
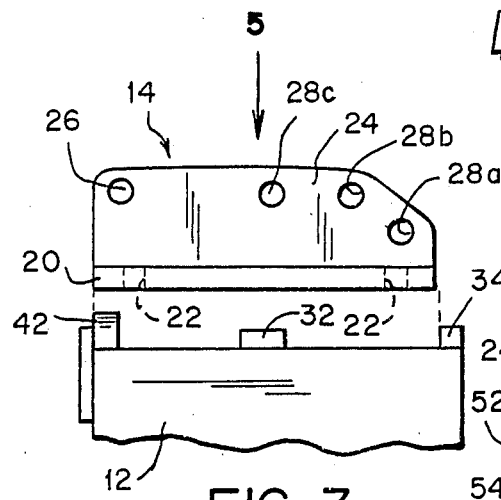
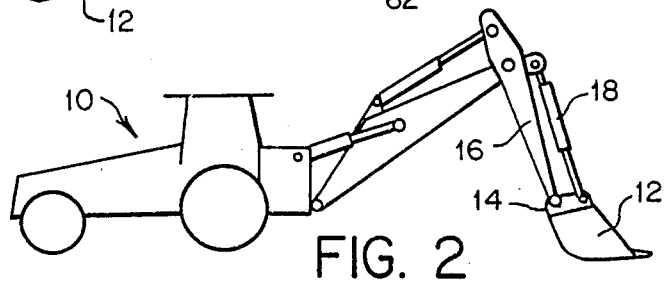
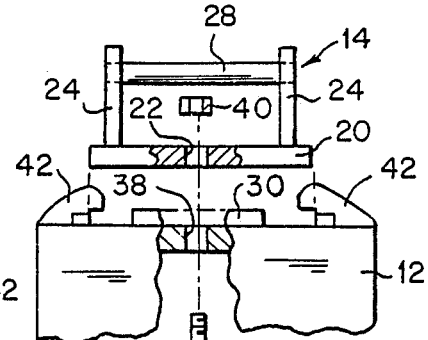
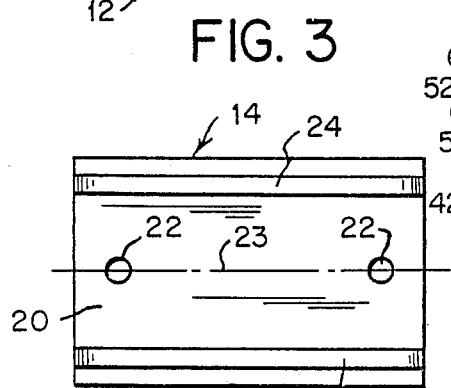
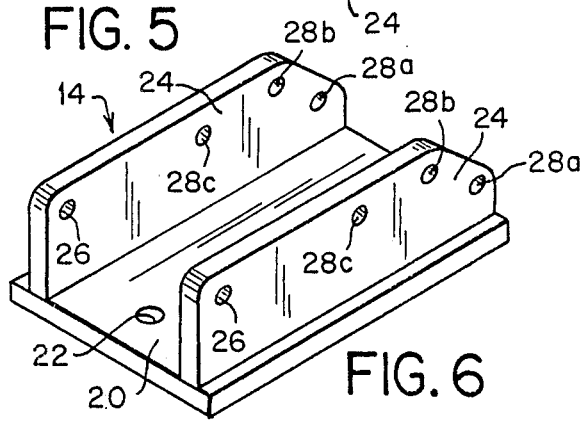
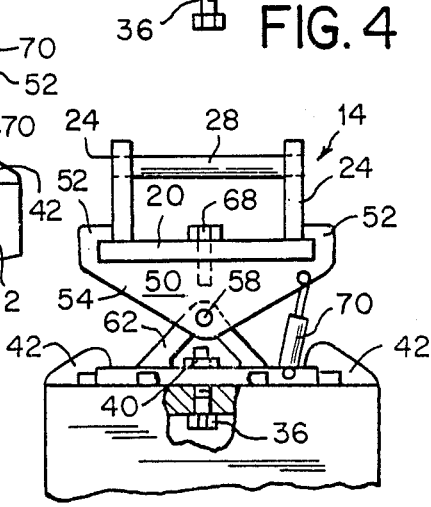

QUICK ATTACH BUCKET SYSTEM FOR BACKHOES AND THE LIKE

BACKGROUND OF THE INVENTION

1. Field of the Invention

This invention relates to a quick attachment mounting plate for connecting a bucket to a backhoe in which the bucket can be mounted either for standard digging when the bucket is pulled toward the tractor or for reverse digging where the bucket is moved away from the tractor. A novel bucket tilting fixture is also described.

2. Description of the Prior Art

Because of their flexibility and ability to perform a variety of tasks such as digging, trenching, back filling, concrete removal and grading, equipment such as hydraulic loaders, backhoes and trenchers have been very important in several industries, particularly construction. The speed and ease of changing the various attachments such as buckets, scoops, blades, forks, grapples and baskets to the boom or outer arm of such devices is important, since ;the cost of the equipment and the labor needed to operate the equipment is very costly.

Quick attachment devices for such equipment are well known in the prior art. For example, U.S. Pat. No. 4,297,074 to Balliger shows a dual hook carriage attachable to the boom of excavating equipment and adapted to be connected to a pair of beams on the bucket or other attachment. Lenertz et al, U.S. Pat. No. 4,436,477 describes a complex quick attachment carrier for releasably connecting an attachment to a front end loader using notches and latch hooks engaging pins on the attachment. And the U.S. Pat. to Coyle et al, No. 4,452,560 describes a quick coupler assembly for attaching a bucket or the like to the free ends of lift arms extending from a loader, the assembly including an elongated cross member having hitch brackets on its ends configured for engaging coupling members on the bucket rear wall. Lenertz et al, also describes a number of other prior art devices. Each of these references requires that the bucket or other attachment be specially configured which means that they cannot be used with other attachments. Further, unlike the present invention, these prior art devices are not reversible.

SUMMARY OF THE INVENTION

The present invention comprises a simple bucket mounting plate which has a flat back and a pair of parallel mounting brackets extending therefrom. The back of the mounting plate is attached by a pair of heavy bolts to the bucket. The brackets have a pair of arms extending perpendicularly to the back with a plurality of opposing holes for containing pins to which the boom and the hydraulic cylinder linkages may be attached. The brackets are designed so that the mounting plate may be mounted reversibly to the bucket, enabling the bucket to be attached such that it is moveable either toward or away from the backhoe or other equipment.

It is an object of the present invention to provide a simple and inexpensive mounting plate for attaching a bucket or other attachment to a backhoe or the like.

Another object of this invention is a mounting plate which may quickly be changed to permit the bucket or other attachment to be reversed on the boom of the backhoe.

A still further object of this invention is a quick attachment mounting plate to which a bucket angling device may be attached for horizontal movement of the bucket.

Still further objects and advantages of the invention will become apparent by reference to the following specification and attached drawings.

BRIEF DESCRIPTION OF THE DRAWING FIGURES

The figures in the drawings are briefly described as follows:

FIG. 1 is a diagrammatic side view of a backhoe with a bucket in a standard digging position facing the cab;

FIG. 2 is a diagrammatic side view similar to FIG. 1 of a backhoe with the bucket turned around facing away from the cab;

FIG. 3 is an enlarged exploded side view showing the bucket mounting plate separated away from the bucket;

FIG. 4 is an exploded end view with parts broken away taken in the direction of arrow 4 in FIG. 3 showing the mounting, bolt and nut;

FIG. 5 is a top view of the bucket mounting fixture taken in the direction of arrow 5 in FIG. 3;

FIG. 6 is a perspective view of the bucket mounting plate;

FIG. 7 is an end view showing a bucket tilting fixture disposed between the bucket and the mounting plate so that the bucket can be angled from side to side;

FIG. 8 is a perspective view of the bucket tilting fixture; and

FIG. 9 is an end view similar to FIG. 7 but illustrating two bucket tilting fixtures disposed between he bucket mounting plate and the bucket in order to provide greater angular movement of the bucket from side to side.

DESCRIPTION OF THE PREFERRED EMBODIMENTS

In FIGS. 1 and 2 there is shown a standard backhoe with a cab 10 to which well known mechanical and hydraulic arms are attached to manipulate a bucket 12 or other attachment via a novel mounting plate 14, an enlarged view of which is shown in FIG. 3. Boom 16 and piston 18 are attached to mounting plate 14. In FIG. 1 the bucket 12 is pulled toward cab 10, while in FIG. 2 the mounting plate has been reversed and the bucket 12 is mounted to dig or shovel away from cab 10. The ability to mount bucket 12 in a reverse manner is not generally available, and when used enables the backhoe to perform work such as tunneling under walls or sidewalks previously impossible with backhoes.

In FIGS. 3-6 are shown the bucket mounting plate 14, and in FIGS. 3 and 4 its mounting to the bucket 12 is illustrated. Mounting plate 14 is constructed of heavy, solid material such as steel and has a flat, rectangular back portion 20 containing a pair of cylindrical holes 22 spaced apart preferably along a centerline 23 of said back portion and adapted to receive bolts therethrough. Extending from back portion 22 are a pair of mounting arms 24 comprising flat plates attached such as by welding along a narrow edge thereof to back portion 20 so as to be parallel to each other and the centerline 23 of the back portion 20. The mounting arms are substantially rectangular at one exterior corner while the other exterior corner is truncated or slightly rounded to form a substantially smooth surface which serves as an extension of the bottom of bucket 12.

A plurality of cylindrical holes are contained in each mounting arm 24 as matched pairs which are aligned opposite each other. Holes 26 at the rectangular corner of each mounting arm 24 are adapted to receive a pin 28 (FIG. 4) by means of which the mounting plate 14 is attached to arm 16 of the backhoe. Holes 28a, 28b and 28c are adjacent to the truncated corner of each mounting arm 24 and are adapted to receive a pin similar to pin 18 of the backhoe. A plurality of holes 28 are desirable in order to provide multiple attachment points for cylinder 18 when the bucket 12 is in its reverse position. In other words, one pair of holes 28a, 28b and 28c can be used when the bucket 12 is in its normal position, and another set when the bucket 12 is in its reverse position, to change the angle of the bucket 12 relative to align the bucket in one of three positions in either the normal or reverse modes to suit the type of work being performed. It also permits the bucket mounting plate 14 to be used with differing types and makes of heavy equipment.

The back 20 of bucket mounting plate 14 is pressed against thrust plates 30, 32 and 34 (FIGS. 3 and 4) secured on the back of bucket 12 and a pair of bolts 36 of approximately one inch diameter are passed through holes 38 in the back of bucket 12 and secured by nuts 40 so that back 20 presses firmly against thrust plates 30, 32 and 34. Connection hooks 42 (FIG. 4) are also fixed to the back of the bucket 12 on the bottom thereof.

To change a bucket 12, the bucket 12 is removed by removing bolts 36. The bucket 12 is then set on the ground, and mounting plate 14 will slide up along the back of bucket 12 until it is clear of the thrust blocks and connection hooks. The mounting plate 14 is then moved to the next bucket where it will slide under the connection hooks 42. The new bucket 12 is then lifted and the bolts 36 connected. Due to the novel construction the bolts 36 take no side stress and in normal digging conditions will last about one year. If holes 22 are tapered as shown, a fine threaded bolt 36 may be installed hand tight only and will not loosen. Reversing a bucket involves the same procedure except that the bucket mounting plate 14 is mounted on bucket 12 in the reverse direction, i.e., the rectangular exterior corner of the mounting plate 14 is mounted where the rounded corner was, and vice versa. Changing or reversing buckets is clean, with no greased pins to handle, and takes about one minute.

FIGS. 7, 8 and 9 show a bucket tilting fixture 50 which connects between the bucket 12 and the mounting plate 14. The fixture 50 has two flanged rims 52 and a triangular top and bottom 54 in which there is a hole 56 adapted to secure a pin 58. The bucket tilting fixture 50 is rotatively held by the pin 58 to a flat backing plate 60 to which is secured a triangular mounting plate 62 also containing holes (not shown) through which pin 58 is passed to enable the bucket tilting fixture 50 to rotate about the end of mounting plate 62. A pair of screw holes 64 are located on the flat face 66 of the bucket angle assembly through which a threaded screw 68 passes to secure the mounting plate 14 to the bucket tilting fixture 50 as shown in FIG. 7. As also seen in FIG. 7, bolts 36 and nuts 40 are inserted into screw holes in back plate 60 (not shown) to secure the back plate 60 to the bucket 12.

To move the bucket 12 relative to the backhoe in a horizontal plane, i.e., about pin 58, a piston 70 is attached between back plate 60 and bucket tilting fixture 50, movement of piston 70 rotating the bucket 12 relative to the fixed bucket tilting fixture 50. Activating means, not shown, are required for piston 70.

FIG. 9 shows two bucket tilting fixtures 50 disposed between the bucket mounting plate 14 and the bucket 12, and two pistons 70 which may be controlled independently of each other, or together. Since horizontal rotation may occur about either or both pins 58, greater angular movement of the bucket 12 from side to side is provided as well as unique sidewards displacement of the bucket if desired.

While the invention has been described with reference to a preferred embodiment thereof, it is apparent that changes may be made without departing from the scope of the invention as hereinafter claimed.

What is claimed is:

1. In a backhoe or the like having a mounting plate connecting the support arm and control linkage of said backhoe with the bucket or other working implement, an improved mounting plate which permits mounting of the bucket in the normal or reverse positions and is adapted for attachment to a bucket angling device comprising:

a) a narrow rectangular back plate having flat, parallel front and back faces and a pair of tapered cylindrical holes extending therethrough;

b) a pair of symmetrical mounting plate arms each comprising a flat plate attached along a narrow inside edge thereof to the front face of said back plate and extending perpendicularly therefrom, said mounting plate arms being parallel to each other and parallel to opposite edges of said back plate and separated from each other a distance greater than half the width of said back plate, said cylindrical holes being located between said mounting plate arms;

c) said mounting plate arms being approximately rectangular and having outside edges that are substantially parallel to the front face of said back plate, one corner of the outside edge of each of said mounting plate arms being substantially rectangular and having a single cylindrical hole adjacent said one corner whereby the single cylindrical holes in both of said mounting plate arms are directly opposite each other, the other corner of the outside edge of each of said mounting plate arms being tapered smoothly toward the front face of said back plate and having a plurality of cylindrical holes adjacent the outside edge spaced from each other from a point near the center of said outside edge along the tapered corner whereby the plurality of cylindrical holes in both said mounting arms are directly opposite each other;

d) the back face of said back plate being adapted to contact the outside surface of thrust plate means located on the back of said bucket with the tapered cylindrical holes in said back plate being aligned with cylindrical holes through the back of said bucket whereby said back plate is secured to said bucket by means of bolt means passed through said aligned cylindrical holes; and e) said mounting plate arms being adapted to be connected to said backhoe whereby a support arm of said backhoe is connected at said one corner by said single cylindrical hole in said mounting arms, and a control arm of said backhoe is connected at said other corner by one of said plurality of cylindrical holes in said mounting arms.

2. An improved mounting plate as in claim 1 in which said bucket has an open top portion and a closed bottom portion and in which the mounting plate is adapted to be connected to the bucket so that the rectangular outside edge of said mounting plate arms is adjacent to the open portion of said bucket whereby said bucket is in its normal position which with its open portion movable toward said backhoe, and said mounting plate is also adapted to be connected to the bucket so that the tapered outside edge of said mounting plate arms is adjacent to the closed portion of said bucket whereby said bucket is in its reverse position with its open portion movable away from said backhoe.

3. An improved mounting plate as in claim 1 and further including a first bucket tilting fixture comprising:
   a) a first fixture portion having a flat face with opposed flanged sides and threaded holes in the flat face thereof and adapted to secure the back face of said bucket mounting plate thereto; and
   b) a second fixture portion having a flat face with holes therein and adapted to be secured by bolt means to said bucket, and joining means connecting said first and second fixture portions whereby said first fixture portion is horizontally rotatable relative to said second fixture portion.

4. An improved mounting plate as in claim 3 and including actuator means for moving said first fixture portion relative to said second fixture portion and connected to each of said fixture portions.

5. An improved mounting plate as in claim 3 and including means for connecting a second bucket tilting fixture to said first bucket tilting fixture whereby greater angular movement of said bucket is provided.

* * * * *